United States Patent
Wright et al.

(10) Patent No.: US 10,040,697 B2
(45) Date of Patent: *Aug. 7, 2018

(54) METHOD FOR MIXING INDUSTRIAL WASTE WATER WITHIN A GRAVITY SETTLING TANK

(71) Applicant: ClearCove Systems, Inc., Victor, NY (US)

(72) Inventors: Terry Wright, Rochester, NY (US); Qausarali Goriawala, Rochester, NY (US)

(73) Assignee: ClearCove Systems, Inc., Victor, NY (US)

( * ) Notice: Subject to any disclaimer, the term of this patent is extended or adjusted under 35 U.S.C. 154(b) by 239 days.

This patent is subject to a terminal disclaimer.

(21) Appl. No.: 14/874,400

(22) Filed: Oct. 3, 2015

(65) Prior Publication Data

US 2017/0073245 A1    Mar. 16, 2017

Related U.S. Application Data

(63) Continuation-in-part of application No. 14/851,125, filed on Sep. 11, 2015.

(51) Int. Cl.
*C02F 1/52* (2006.01)
*C02F 1/00* (2006.01)
(Continued)

(52) U.S. Cl.
CPC .......... *C02F 1/006* (2013.01); *B01D 21/0087* (2013.01); *B01D 21/2405* (2013.01);
(Continued)

(58) Field of Classification Search
CPC ............ B01D 21/2427; B01D 21/0018; B01D 21/0087; B01D 21/02; B01D 21/2405;
(Continued)

(56) References Cited

U.S. PATENT DOCUMENTS 2,098,467 A    11/1937  Sayers
3,208,834 A *  9/1965  Schulze ............... B01D 9/0031
                                                159/45
(Continued)

*Primary Examiner* — Pranav N Patel
(74) *Attorney, Agent, or Firm* — Harris Beach PLLC; Neal L. Slifkin

(57) ABSTRACT

A method for static mixing in a waste water settling tank to increase the percentage of recovery of entrained solids from the waste water comprising a settling tank having a recirculation ring and a hopper bottom defining a sludge hopper, a fluid deflector centrally disposed within the space contained in the hopper bottom having a flat portion, and an inlet pipe for introduction of waste water containing second entrained solids into the settling tank and having a discharge outlet in proximity to the underside of the deflector dome and a nozzle facing downward. Influent waste water is directed vertically downward toward the flat portion and upward into the center of the fluid deflector which distributes the influent radially into contact, preferably turbulent, with previously introduced waste water containing first entrained solids to cause coalescence of the first and second entrained solids to form larger particles having increased settling velocity.

7 Claims, 2 Drawing Sheets

(51) Int. Cl.
*C02F 1/66* (2006.01)
*B01D 21/00* (2006.01)
*B01D 21/24* (2006.01)
*C02F 103/32* (2006.01)

(52) U.S. Cl.
CPC .......... *B01D 21/2427* (2013.01); *C02F 1/008* (2013.01); *C02F 1/52* (2013.01); *C02F 1/66* (2013.01); *C02F 2001/007* (2013.01); *C02F 2001/5218* (2013.01); *C02F 2103/32* (2013.01); *C02F 2209/06* (2013.01); *C02F 2209/08* (2013.01); *C02F 2209/10* (2013.01); *C02F 2209/40* (2013.01); *C02F 2301/04* (2013.01)

(58) Field of Classification Search
CPC ............ B01D 21/2416; B01D 21/2422; B01D 21/0039; B01D 21/245; B01D 21/2411; C02F 2209/10; C02F 1/006
See application file for complete search history.

(56) References Cited

U.S. PATENT DOCUMENTS

| | | | |
|---|---|---|---|
| 4,035,284 A | | 7/1977 | Gross et al. |
| 4,832,854 A | | 5/1989 | Keeter |
| 5,076,915 A | | 12/1991 | Rose |
| 5,346,631 A | | 9/1994 | Terry |
| 5,505,860 A | | 4/1996 | Sager |
| 5,833,865 A | * | 11/1998 | Harato .................. B01D 21/01 210/207 |
| 5,928,492 A | * | 7/1999 | Corlett ............... B01D 21/0009 204/515 |
| 6,334,952 B1 | | 1/2002 | Hayakawa et al. |
| 8,225,942 B2 | | 7/2012 | Wright |
| 2011/0100931 A1 | * | 5/2011 | Lake .................. B01D 21/0018 210/800 |
| 2012/0248036 A1 | | 10/2012 | Schaller |
| 2016/0090312 A1 | | 3/2016 | Wright et al. |

* cited by examiner

METHOD FOR MIXING INDUSTRIAL WASTE WATER WITHIN A GRAVITY SETTLING TANK

RELATIONSHIP TO OTHER APPLICATIONS AND PATENTS

The present application is a Continuation-In-Part of a pending U.S. patent application Ser. No. 14/851,125, filed Sep. 11, 2015, the disclosure of which is incorporated herein by reference in its entirety.

BACKGROUND OF THE INVENTION

The present invention is directed to systems for treatment of industrial or agricultural waste water; more particularly, to systems for removing solids, e.g., food materials, from an industrial or sanitary waste water stream, e.g., a food process or sewage waste water stream; and most particularly to a system for static mixing in a waste water settling tank to increase the percentage of recovery of entrained solids from the waste water.

As used herein, the term "food materials" should be taken to mean any and all biologically digestible organic materials, without limit; the term "food process waste water" should be taken to mean excess water and by-products, components beyond just water itself, used in the manufacture and/or use of food materials, which water must be treated to remove a portion of the dissolved and/or suspended food materials before being either sent to a waste water treatment facility, landfill, or otherwise discharged to the environment.

Foods and potables manufacturing and handling typically require large volumes of input process water and generate substantial levels of biologically digestible materials dissolved and suspended in their waste process water. Additionally, the pH of such waste water may be substantially acidic or alkaline. When directed without pre-treatment to municipal waste water treatment facilities, such waste water can place a heavy and costly load on municipal waste treatment facilities. As a result, many communities impose a substantial cost on companies that generate such waste waters in the course of their operations. It is known to monitor the level of food materials in waste water output of companies and to levy a sewer surcharge on the companies accordingly. Many of these companies, for example, "microbreweries", are relatively small in capitalization and output and thus are in need of a relatively inexpensive method and associated apparatus for pre-treating of process waste water to remove a substantial percentage of suspended food materials therefrom before the process waste water is discharged to a municipal sewer system. Fortuitously, the total volume of process waste water generated by many such operations is relatively small, on the order of 1000 gallons/day or less, and therefore is amenable to treatment by a method and apparatus in accordance with the present invention. Larger scale operations can also be supported by scaling up with multiple modules of the present invention.

Note: "Biochemical Oxygen Demand" (BOD), also known as Biological Oxygen Demand, is the amount of oxygen needed by aerobic microorganisms to decompose all the organic matter in a sample of water; it is used in the eco-sciences as a measure of organic pollution. As used herein, the term "BOD" also means more generally the unit volume load, both dissolved and suspended, of such organic material in waste water.

Further, Total Suspended Solids (TSS) is a water quality measurement which, as used herein, is expressed as the unit volume load of suspended solids, both organic and inorganic, in water. It is listed as a conventional pollutant in the U.S. Clean Water Act.

EXAMPLE

The following example is directed to the characteristics and treatment of waste water generated by breweries. It should be understood that the disclosed method and apparatus are also well-suited to similar usage in many other types of industrial and agricultural manufacturing and use as noted above.

Breweries have unique effluent characteristics and specific treatment needs. Breweries typically have Biological Oxygen Demand (BOD) levels of 2,000-4,000 mg/l and Total Suspended Solids (TSS) levels of 2,500-3,500 mg/l. The solids are fairly heavy and easy to settle out, and much of the dissolved organic load can also be precipitated out by dosing the waste water with coagulants. Brewery effluent can typically have a pH range of 2 to 12, depending on what process is taking place in the brewery. The pH may have to be adjusted on occasion to meet municipal requirements and also be bought into optimum range for effective chemical treatment. Brewery effluent can have fluctuating levels of BOD, TSS and pH. There is also a chance that occasionally the brewery may have to waste a batch of beer, discharging the batch and introducing high levels of BOD into a municipal system.

Brewery waste water comprises several contributors to the total BOD and TSS load. Most of these are organic in nature and pose no serious threat to public health.

Yeast, spent grain, and hops are the building blocks of beer. Most of the wastes from these components typically are side streamed in the brewery and diverted as feed for farm animals. Inevitably, some of that waste also will get down the drain and thereby raise the BOD and TSS levels of the process effluent.

Wort is the liquid that will become beer once the yeast is added. Wort comprises fermentable and unfermentable sugars as well as starches and proteins. Because wort is rich in dissolved sugar, it is the primary contributor of BOD and SBOD (soluble BOD).

Fermented beer left in tanks after transfers and lost during packaging also contributes to the BOD and SBOD of the effluent leaving the brewery.

Beer has a characteristically low pH (typically 4-5.5) that can reduce the overall pH of the waste water.

For cleaning chemicals, breweries typically rely on caustic solutions for removing organic deposits from their process tanks. Acid is used on occasion, as are iodine-based sanitizers and peracetic acid for sanitizing tanks and equipment. These are diluted when used, but will still affect the pH of the final effluent.

Most of the water used by breweries leaves in the form of finished beer, so daily waste water flows are relatively low and comprise mostly cleaning water. A typical microbrewery may generate no more than about 200-300 gallons of process waste water per day, although naturally that volume will grow as production volumes grow.

Typical prior art waste water treatment systems are intended for continuous flow of waste water. However, many manufacturing processes are operated intermittently, e.g., on a day-night cycle, wherein there is little or no flow for significant periods of time. Such a cycle affords an opportunity for a gravity settling apparatus for removing non-floating solids from a waste water stream.

What is needed is an improved Enhanced Primary Treatment (EPT) waste water gravity settling system for removing biologically-digestible solids from food process waste water to improve waste water quality for discharging into a municipal sewage system.

What is further needed is an arrangement within such an EPT waste water settling system for increasing the percentage of removal of non-floating biologically-digestible solids.

SUMMARY OF THE INVENTION

Current waste water treatment systems maintain a continuous flow of influent entering a clarification tank. Effluent exits the clarification tank for secondary treatment. As disclosed in U.S. Pat. No. 7,972,505, "Primary Equalization Settling Tank", U.S. Pat. No. 8,225,942, "Self-Cleaning Influent Feed System for a Waste Water Treatment Plant", U.S. Pat. No. 8,398,864, "Screened Decanter Assembly", pending U.S. patent application Ser. No. 14/141,297, "Method and Apparatus for a Vertical Lift Decanter System in a Water Treatment Systems", U.S. patent application Ser. No. 14/142,099, "Floatables and Scum Removal Apparatus", U.S. patent application Ser. No. 14/325,421, "IFS and Grit Box for Water Clarification Systems" and U.S. patent application Ser. No. 14/471,247 "Method and Apparatus for Using Air Scouring of a Screen in a Water Treatment Facility", the inventor has developed systems and processes for primary clarification of the waste water. The above named applications and patents are incorporated herein by reference in their entirety for all purposes.

A new improved apparatus and method to treat industrial or sanitary waste water, or mixtures thereof, is now described in more detail.

In accordance with apparatus of the present invention, an EPT waste water treatment system includes a sludge hopper, preferably conical, in a lower portion of a clarification, or settling, tank with an outlet for the sludge. Preferably, the bottom of the sludge hopper is flat and an exit pipe is located on the side of the sludge hopper adjacent the flat bottom. A screened decanter is provided within the clarification tank and has an outlet for screened waste water that passes through the screened decanter. The screened decanter is at an elevation higher than the sludge hopper and may be equipped to follow vertical changes in the upper surface of waste water within the clarification tank. The system includes an influent pipe for delivering waste water influent fluid into the clarification tank. The influent pipe is at an elevation above the sludge outlet and below the screened decanter. A fluid deflector assembly is provided such that the influent pipe directs an upward-directed first portion of waste water influent against the fluid deflector assembly. A nozzle directs a downward-directed second portion of waste water influent against a flat bottom portion of the sludge hopper. Flows through the fluid deflector assembly and nozzle act together to create mixing of newly-introduced influent with influent and previously settled solids already in the clarification tank and to create turbulence to equalize and slow the velocity of the influent. A blocking ring is provided along the clarification tank wall above the fluid deflector assembly to prevent upward flow of influent along the tank wall and to divert any such flow toward the center of the tank for return to the sludge hopper.

In operation, in a currently preferred embodiment of the invention, the operating cycle for the EPT includes mixing the BOD-rich influent with "seeded" BOD solids that are purposely retained in the sludge hopper from the previous cycle as the clarification tank is emptied. The retained BOD sludge solids typically take the form of a loose concentration of particles of various sizes and shapes in a layer on the bottom of the tank. Through turbulent agitation this layer may be dispersed and re-suspended into the mixing zone below the fluid deflector assembly. Coalescence of BOD particles occurs in the sludge hopper during mixing with influent because influent BOD particles adhere to, and add to, the suspended BOD "seeded" particles when they collide.

Subsequently, after the tank is full and/or influent flow is terminated, there is a settling period as the coalesced BOD settles to re-form the sludge layer in the hopper section of the EPT. When the settling period is complete, most but not all of the settled BOD sludge is drained from the hopper, leaving some of the sludge layer as "seeding" for the next cycle, while the relative clean water in the elevated clarification section of the EPT is drawn off via the vertically-mobile decanter.

In the present invention, mixing desirably is sufficient only to keep the sludge layer dispersed and re-suspended into the mixing zone below the dome. If impinged directly on the sludge layer, the influent fluid exiting the influent pipe is at too high a velocity to permit settling of small BOD particles and therefore requires rapid attenuation. The dome-shaped fluid deflector assembly permits relatively high influent volumes and velocities to enter the tank by simultaneously attenuating the influent velocity to a desired lower level and turning the influent flow outward and downward on a velocity vector shown experimentally to provide adequate mixing while still allowing settling of BOD in influent to continue above the fluid deflector assembly.

In keeping with a design ideal of simplicity and inexpensive fabrication of an EPT system, mixing in accordance with the present invention occurs as a result of the static arrangement of system components, without dynamic mixing. Thus, by controllably and optimally agitating the sludge layer, such static mixing of incoming BOD particles with existing sludge is an important element and discovery in accordance with the present invention.

Further features and advantages of the present invention will become apparent to those of ordinary skill in the art in view of the drawings and detailed description of preferred embodiments below.

BRIEF DESCRIPTION OF THE DRAWINGS

The present invention will now be described, by way of example, with reference to the accompanying drawing, in which.

DETAILED DESCRIPTION OF THE PREFERRED EMBODIMENT

Figure 1:
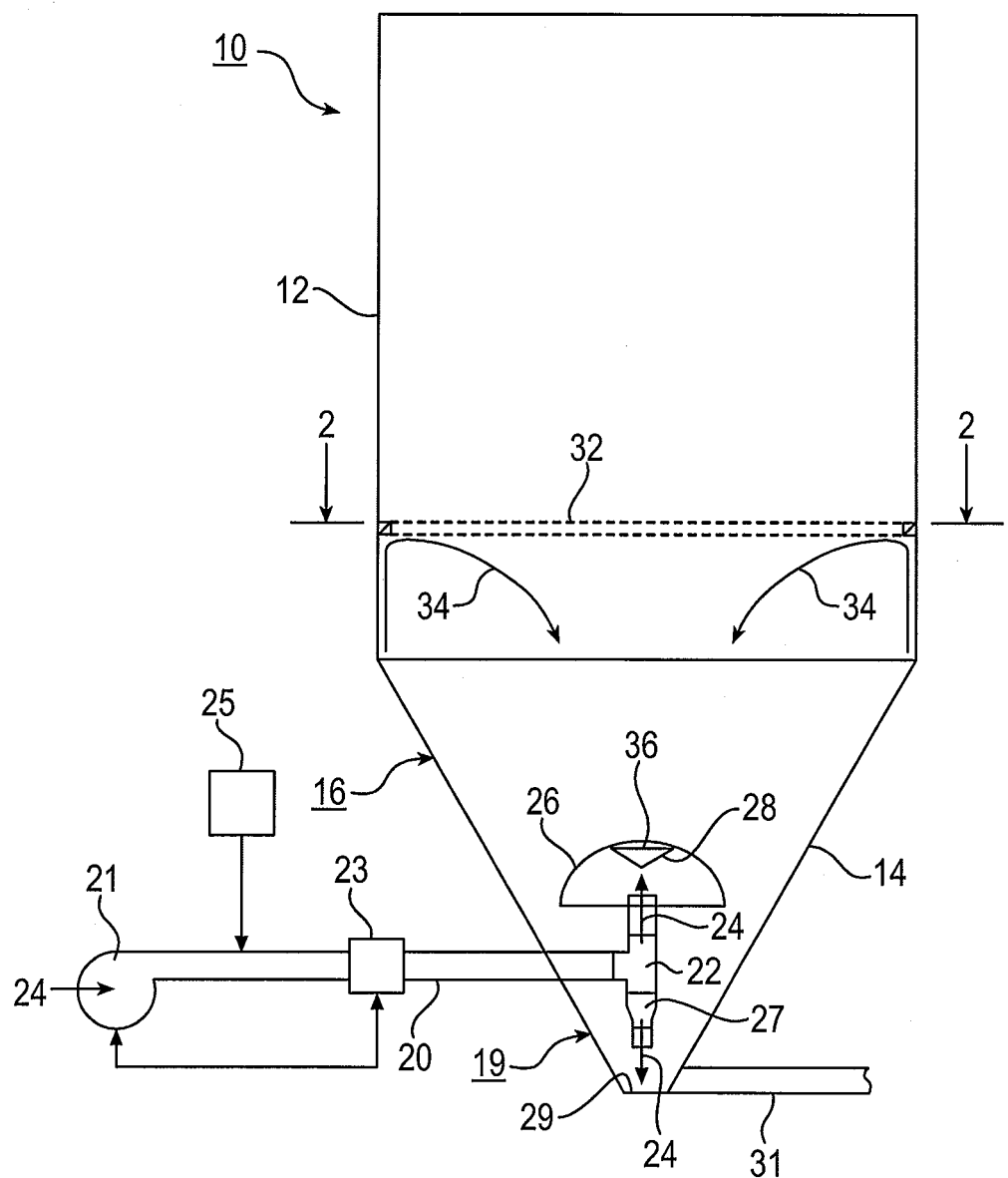
FIG. 1 is a schematic elevational cross-sectional view, not to scale, of a portion of an EPT waste water gravity settling system in accordance with the present invention.
Figure 3:
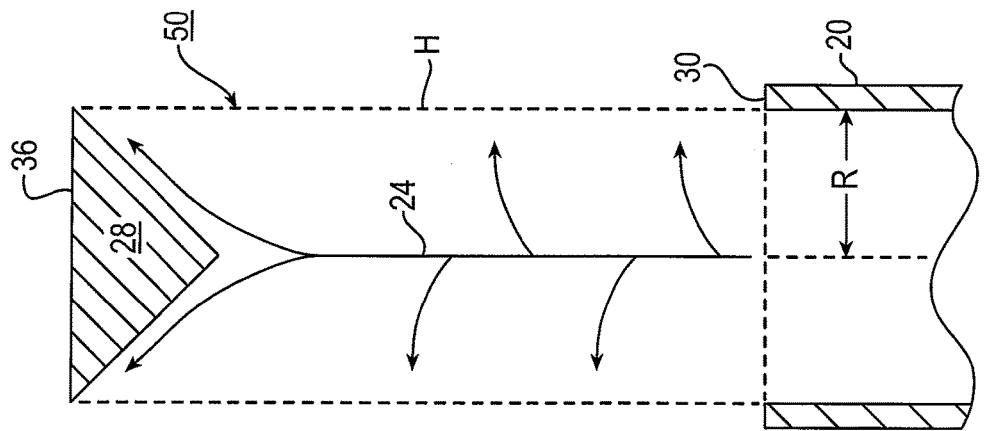
FIG. 3 is a schematic elevational cross-sectional view, not to scale, of the cylindrical region of flow between the inlet pipe and the fluid deflector assembly.
Figure 2:
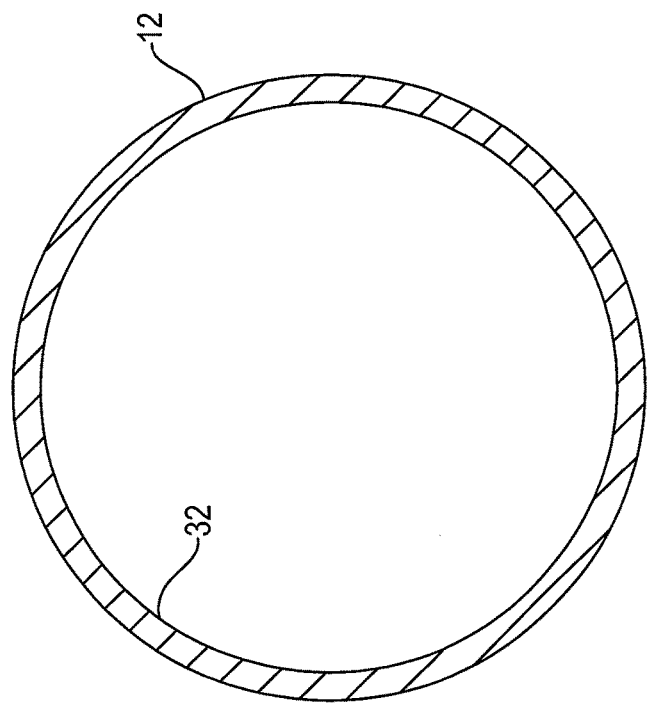
FIG. 2 is a cross-sectional view taken along line 2-2 in FIG. 1.

Referring now to FIGS. 1, 2, and 3, a system (method and apparatus) 10 for static mixing in an industrial and municipal waste water settling tank to improve the recovery of solids therefrom comprises a tank 12 provided with a sludge hopper 14 in a bottom portion 16 of tank 12 (not to scale). In a currently preferred embodiment, tank 12 is cylindrical and sludge hopper 14 is conical with an exit region 19 comprising a flat bottom 29 and side drain 31. Within the scope of the present invention, exit region 19 may assume any desired shape although flat is currently preferred. A waste water influent pipe 20 carries waste water and solids into tank 12. The flow of waste water influent is provided by a pump 21 and is controlled by flow control apparatus 23 which may include a flow meter and control valving (not shown) in known fashion. Further, dosing apparatus 25 may be provided for, e.g., adjusting pH of the influent or adding coagulants and/or flocculants thereto.

Preferably, waste water influent pipe 20 comprises a "T" 22 such that waste water and solids 24 are discharged upward against a fluid deflector assembly 26 and downward via a nozzle 27 against flat bottom portion 29. Preferably, about 85% of the total flow is directed upward and about 15% is directed downward. Preferably, fluid deflector assembly 26 comprises a dome provided preferably with an inverted distribution cone 28 on its underside, as shown in FIG. 1; however, within the scope of the present invention, a fluid deflector or fluid deflector assembly may take the form of any of various shapes, with or without cone 28, as may be dictated by a particular application. Further, distribution cone 28 may take any desired three-dimensional shape, e.g., cube or pyramid, although cone is preferred, especially when tank 12 is cylindrical and sludge hopper 14 is conical.

Preferably, fluid deflector assembly 26 is centrally disposed within the space enclosed by sludge hopper 14. The uniformity of flow of influent radially along the underside of inverted cone 28 and fluid deflector assembly 26 is very sensitive to the alignment of the influent jet against the fluid deflector assembly. Small deviations of the impingement point of the jet from the center of the inverted cone can cause large variations in the flow from point to point around the dome.

As described above, the operating cycle for the EPT includes static mixing of the BOD-rich influent with "seeded" BOD sludge remaining in the sludge hopper from the previous cycle. Preferably, the sludge layer comprises significant amounts of flocculants and/or coagulants that assist in coalescing the influent BOD particles with the "seeded" BOD.

In operation, fluid deflector assembly 26 slows the influent flow velocity of waste water 24 and redirects it generally outward and downward in a circular pattern toward the walls of sludge hopper 14, and nozzle 27 directs waste water 24 downward against flat bottom portion 29, both actions to facilitate the mixing of solids in the waste water with seeded solids already present in the sludge hopper.

As the fluid level in tank 12 rises and solids begin to settle out of the waste water in sludge hopper 14, coalescence occurs during mixing of influent 24 with material already in sludge hopper 14 because BOD particles tend to coalesce with the "seeded" BOD particles suspended by turbulent agitation from the influent flow.

During such static mixing, the flow 34 of waste water and suspended BOD near the tank wall beyond the edge of fluid deflector assembly 26 is vertically upwards. Unimpeded, this flow has the undesirable effect of transporting BOD rich water into the upper part of tank 12 where the BOD concentration is low, causing both a decrease in the rate of coalescence of the BOD and additional settling time for the BOD transported to the upper part of the tank. To counteract such tendency, a ring 32 is installed in tank 12 above fluid deflector assembly 26 to redirect upward vertical flow 34 toward the center of the tank, thus keeping BOD rich waste water within the lower part of the tank for continued coalescence and settling. As currently preferred, ring 32 is fabricated from stainless steel, fits tightly around the inside of the EPT tank 12, and is approximately 1 inch wide.

Subsequently, during a quiescent settling period after influent flow is terminated, the BOD coalescent sinks into the hopper section of the EPT. When the settling period is complete, most of the settled BOD is drained from the hopper, leaving some BOD as "seeds" for the next cycle, while the relatively clean water in the elevated clarification section of the EPT is drawn off by decanting. It is an important feature of the present invention that the separation percentage of BOD particles in influent waste water entering the tank is increased by a method that impinges such particles on other BOD materials such as but not limited to BOD particles already present therein, causing coalescence thereof into larger particles having greater settling tendency to form a new layer of BOD materials. In the present invention, such impingement is conferred by controlling the influent flow rate in combination with the arrangement of fixed deflector and tank components.

System 10 has been modeled using computer simulation to identify the critical parameters of the design and to establish optimum values for mixing. The simulation indicates that the dome and inverted cone assembly provides the most effective mixing geometry.

Calculations were performed on a system 12 having the following dimensions:

Dome diameter: 15 inches

Dome height: 6 inches

Cylindrical EPT tank inside diameter: 48 inches

Inverted cone within the dome: 5-inch width and 1.5-inch height.

The included cone angle of sludge hopper 14 was 60°. The lower rim of the dome was located approximately 12 inches above the flat bottom 29 of the sludge hopper.

For this configuration as shown in FIG. 3, with a 2-inch diameter influent pipe 20 and influent flow rate of about 80 gpm, optimum mixing under these aforementioned conditions was found to occur when the spacing between upper end 30 of influent pipe 20 and inverted cone 28 was 5 inches.

A wide range of dome deflector and inverted cone dimensions have been shown to provide adequate mixing for a variety of sizes of EPT tank and influent flows. For example, the width of the base 36 of inverted cone 28 preferably at least as wide as the width of the impinging flow which to a good approximation is equal to the inside diameter of upward directed influent pipe 20. Inverted cone 28 preferably has an aspect ratio (height/width) of at least 0.2 to redirect effectively the vertical flow from the influent pipe to radial flow along the underside of dome 26.

A critical factor is the fluid velocity of influent liquid 24 which for good mixing should impinge on the fluid deflector assembly at a velocity between about 2 fps and about 15 fps, with an optimal velocity of about 6 fps (i.e., 2 meters/second).

As flow varies with the square of the pipe ID, an increase in the influent pipe diameter from 2 inches to 4 inches would increase flow about four-fold as flow velocity is held constant, e.g., to 320 gpm to maintain a 6 fps influent velocity. As flow also scales linearly with the influent velocity for a given pipe diameter, reducing influent flow velocity to 3 fps would reduce the flow rate by half.

Referring to FIG. 3, the space between the lip of the influent pipe and the inverted cone defines a virtual cylinder 50 with a diameter equal to that of the influent pipe and a height equal to the spacing between the pipe and the inverted cone. Since by the conservation of volume all the escaping influent 24 must pass through the sides of this virtual cylinder, the cylinder must have a surface area $A_c$ equal to or greater than the cross sectional area of the influent pipe $A_p$ so as not to impede the flow ($A_c \geq A_p$) and thereby create a backpressure condition in influent pipe 20. The surface area $A_c$ of the cylinder is $2R\pi H$ where R is the influent pipe inner radius and H is the distance between the lip of the influent pipe and the inverted cone. This area $A_c$ must be equal to or greater than the cross sectional area of the influent pipe $\pi R^2$, e.g., $2R\pi H \geq \pi R^2$. Therefore, H=R/2, and thus the minimum spacing between the lip and the inverted cone is equal to at least one-half the inner radius of the influent pipe.

The fluid stream 24 from influent pipe 20 into tank 12 will slow and dissipate as it progresses towards inverted cone 28. The maximum distance between the lip of the influent pipe and the inverted cone is determined by the requirement that the upward velocity of the fluid impinging on the inverted cone be at least 4 feet/second so that the fluid has sufficient momentum to promote good mixing within the fluid dynamic streams predicted by computer simulations.

To function effectively, the dome generically need be only an upward convexity defining a concavity on its underside; it need not be spherical or parabolic. The dome serves two functions: a) to create a flow surface sideways and downwards to promote good mixing; and b) to contain the highest velocity flow beneath the dome elevation within the tank, allowing the fluid zone in the tank above the dome to be relatively tranquil to minimize movement of sludge flocs into the upper portion of the tank which can increase the time needed for settling. The diameter of the dome and its specific shape are established by the requirement that the fluid velocity preferably is less than about 1 ft/second at the outer edge of the dome. Higher velocities can push some of the suspended BOD seed particles in the influent into the upper portion of the tank, thus inhibiting coalescence and settling of BOD particles.

Various changes may be made to the structure embodying the principles of the invention. The foregoing embodiments are set forth in an illustrative and not in a limiting sense. The scope of the invention is defined by the claims appended hereto.

What is claimed is:

1. A method for static mixing in a waste water settling tank to increase the percentage of recovery of entrained solids from the waste water, comprising the steps of:
   a) providing a settling tank having a hopper bottom defining a sludge hopper having walls;
   b) providing a fluid deflector disposed within a space contained in said hopper bottom;
   c) providing an inlet pipe for introduction of influent waste water into said settling tank, said inlet pipe having a first discharge outlet in proximity to the underside of said fluid deflector and a second discharge outlet in an exit region of said hopper bottom;
   d) providing residual waste water resident in said sludge hopper and containing first entrained solids;
   e) directing a first influent flow of said influent waste water upward against a surface of said fluid deflector and thence outward toward said walls of said sludge hopper, and directing a second influent flow of said influent waste water downward into said exit region, wherein said first and second influent flows include second entrained solids; and
   f) mixing said first and second influent flows with said residual waste water.

2. A method in accordance with claim 1 wherein the velocity of said first influent flow is between about two feet per second and about fifteen feet per second.

3. A method in accordance with claim 1 wherein the volume of said first influent flow is about six times greater than the volume of said second influent flow.

4. A method in accordance with claim 1 further comprising the steps of:
   a) providing a ring disposed within said settling tank along a wall thereof at a vertical location above said fluid deflector; and
   b) directing a portion of said influent waste water upward against said ring.

5. A method in accordance with claim 1 comprising an additional step of adjusting the composition of said waste water, wherein said adjusting is selected from the group consisting of adding a flocculent, adding a coagulant, adjusting pH, and combinations thereof.

6. A method in accordance with claim 1 comprising an additional step of controlling a flow rate of said waste water.

7. A method in accordance with claim 6 wherein said controlling step includes use of a flow meter and a pump.

* * * * *